June 15, 1926.　　　　　　　　　　　　　　　　1,588,550
A. P. SMITH
CARRYING FRAME FOR BASKETS
Filed Nov. 7, 1924

Inventor
Alexander Pinkney Smith

By Fetherstonhaugh & Co
Attorney

Patented June 15, 1926.

1,588,550

UNITED STATES PATENT OFFICE.

ALEXANDER PINKNEY SMITH, OF EAST MACON, GEORGIA.

CARRYING FRAME FOR BASKETS.

Application filed November 7, 1924. Serial No. 748,445.

The purpose of this invention is to provide a carrying frame for loaded fruit, vegetable or other baskets which will serve to sustain the load and to reinforce the bottom and side portions of the basket.

Other purposes, advantages and characteristic features of the invention will be more readily apparent from the following detailed description and accompanying drawings.

Figure 1:
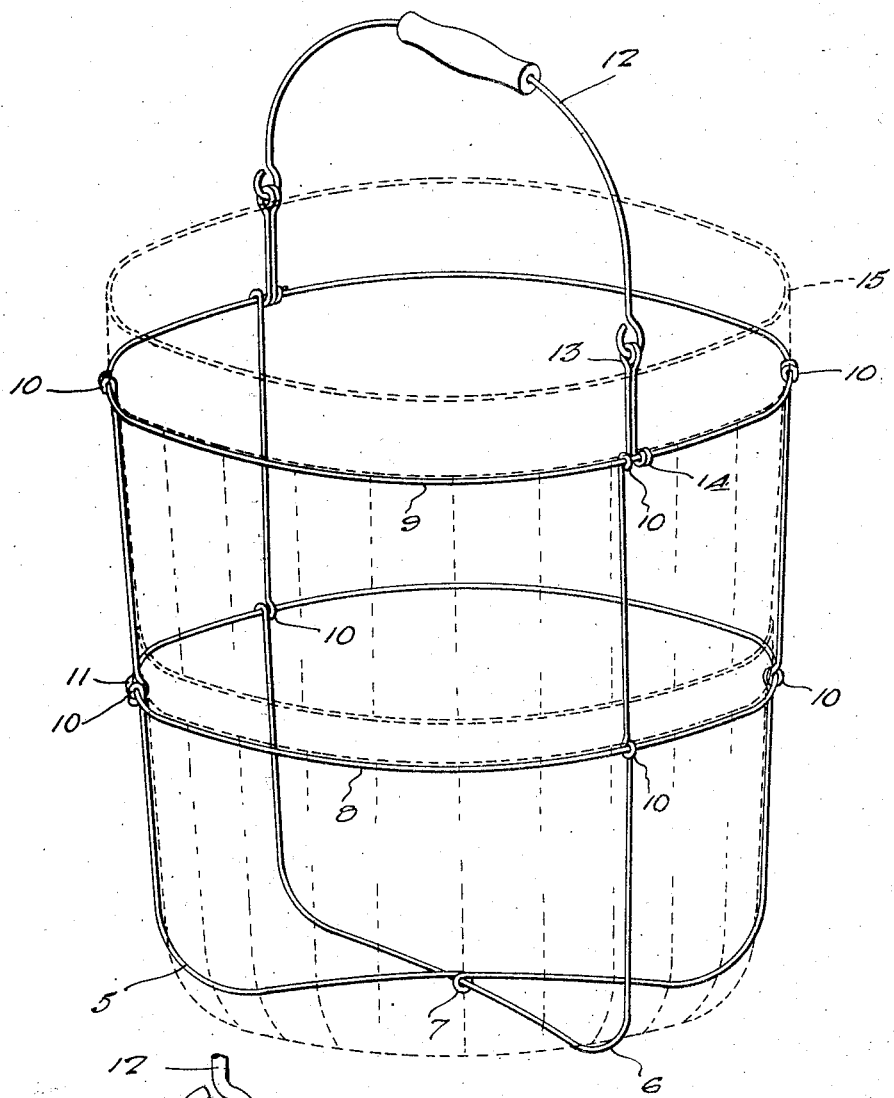
Figure 1 is a perspective view of the carrying frame applied to a basket of standard type.
Figure 2:
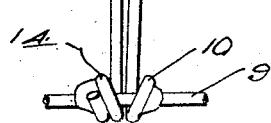
Figure 2 is a detailed view of the connection between the carrying frame and the handle bale.

The carrying frame, as shown in these drawings, comprises two U shaped wire members 5 and 6, arranged at right angles with the bight portion of the member 5 crossing and looped about the corresponding portion of the member 6, substantially as indicated at 7. Preferably members 5 and 6 are soldered together at the intersection 7 but this is not absolutely essential.

The vertical arms of the aforesaid members serve to support a pair of vertically spaced wire rings 8 and 9 about which the said arms are wrapped as indicated at 10. It is preferred that these rings 8 and 9 be soldered to the arms as indicated at 11 in order to add to the rigidity of the structure.

To provide for the attachment of the handle bail 12, the arms of the member 6, after being wrapped around the upper ring 9, are carried vertically and looped to form eyes 13 in which the ends of the handle bail are engaged as shown. After forming the eyes 13 the extremities of said arms are carried downwardly and again wrapped around the ring 9 as indicated at 14.

From the foregoing it will be apparent that the members 5 and 6 together with the rings 8 and 9 form a comparatively light and rigid frame for the reception of a basket 15, insertable in the frame as indicated by dotted lines in Figure 1.

Having thus fully described my invention it will be understood that I do not limit myself to the exact details set forth but reserve the right to resort to any desired changes within the spirit and scope of the appended claim.

What I claim as my invention is:

A carrying frame for baskets comprising a pair of U-shaped wire members arranged at right angles to each other with the bight portion of one member crossing and looped about the bight portion of the other member, a pair of vertically spaced wire rings about which the arms of said members are looped to support said rings in position, the arms of one of said members being carried above the upper ring and coiled to provide eyes above said ring and being then carried downwardly and again looped about the upper ring in such manner that the eyes are connected to the upper ring by two stands lying close together and a wire bale having hooked extremities engaged in said eyes.

In testimony whereof I hereunto affix my signature.

ALEXANDER PINKNEY SMITH.